(12) United States Patent
Tatarnic

(10) Patent No.: US 6,658,753 B2
(45) Date of Patent: Dec. 9, 2003

(54) FENCE POST POSITIONING APPARATUS

(76) Inventor: Michael J. Tatarnic, 43 Haldibrook Road, Caledonia, Ontario (CA), N3W 1M9

(*) Notice: Subject to any disclaimer, the term of this patent is extended or adjusted under 35 U.S.C. 154(b) by 0 days.

(21) Appl. No.: 10/036,419

(22) Filed: Jan. 7, 2002

(65) Prior Publication Data

US 2002/0095813 A1 Jul. 25, 2002

(30) Foreign Application Priority Data

Jan. 22, 2001 (CA) .............................. 2331600
Jun. 13, 2001 (CA) .............................. 2350333

(51) Int. Cl.$^7$ .............................................. G01D 21/00
(52) U.S. Cl. ............................. 33/613; 33/809; 33/645
(58) Field of Search .................... 33/613, 645, 333, 33/334, 809

(56) References Cited

U.S. PATENT DOCUMENTS

| | | | | |
|---|---|---|---|---|
| 2,256,554 A | * | 9/1941 | Epstein .................... | 33/613 |
| 3,201,874 A | * | 8/1965 | Christy .................... | 33/645 |
| 3,926,018 A | * | 12/1975 | Joersz .................... | 70/19 |
| 3,977,044 A | * | 8/1976 | Mort ....................... | 16/169 |
| 4,311,300 A | | 1/1982 | Buerger | |
| 4,528,757 A | * | 7/1985 | McKeehan et al. ........ | 33/645 |
| 4,559,716 A | * | 12/1985 | Daughtry et al. ........ | 33/645 |
| 4,625,415 A | * | 12/1986 | Diamontis ............... | 33/645 |
| 4,663,856 A | | 5/1987 | Hall et al. | |
| 4,729,149 A | * | 3/1988 | Brunkan ................... | 16/252 |
| 4,976,040 A | | 12/1990 | Mish et al. | |
| 5,163,233 A | * | 11/1992 | Benson .................... | 33/613 |
| 5,207,004 A | | 5/1993 | Gruetzmacher | |
| 5,255,443 A | | 10/1993 | Schmidt | |
| 5,544,505 A | * | 8/1996 | McIntosh et al. ........ | 70/18 |
| 5,594,669 A | | 1/1997 | Heger | |
| 5,628,119 A | * | 5/1997 | Bingham et al. ......... | 33/613 |
| 6,029,359 A | | 2/2000 | Szumer | |
| 6,173,503 B1 | * | 1/2001 | Houghton et al. ....... | 33/613 |
| 6,293,028 B1 | * | 9/2001 | Sylvia .................... | 33/613 |

* cited by examiner

Primary Examiner—Christopher W. Fulton
Assistant Examiner—Travis Reis
(74) Attorney, Agent, or Firm—Manelli Denison & Selter; Edward J. Stemberger

(57) ABSTRACT

Fence post positioning and leveling apparatus comprising in combination a first post-embracing frame member having an operable and closeable side wall having an inner face defining in a closed mode a post-receiving chamber; rotation means to allow of the opening and closing of the side wall; releasable fastening means to hold the side wall in the closed mode; a second post-embracing frame member having an operable and closeable side wall having an inner face defining in a closed mode a post-receiving chamber; and inter-frame elongate member positioning means adapted to be connected to the first and the second frame members to provide a desired fixed inter-frame member distance. Preferably the inter-frame positioning means comprises a pair of telescopic forks. Each of the frame members preferably has a vertical spirit level and a horizontal spirit level. The apparatus provides for simple fence post alignment, leveling and horizontal cross-post, single-handled, installation at desired, variable inter-post distances.

17 Claims, 3 Drawing Sheets

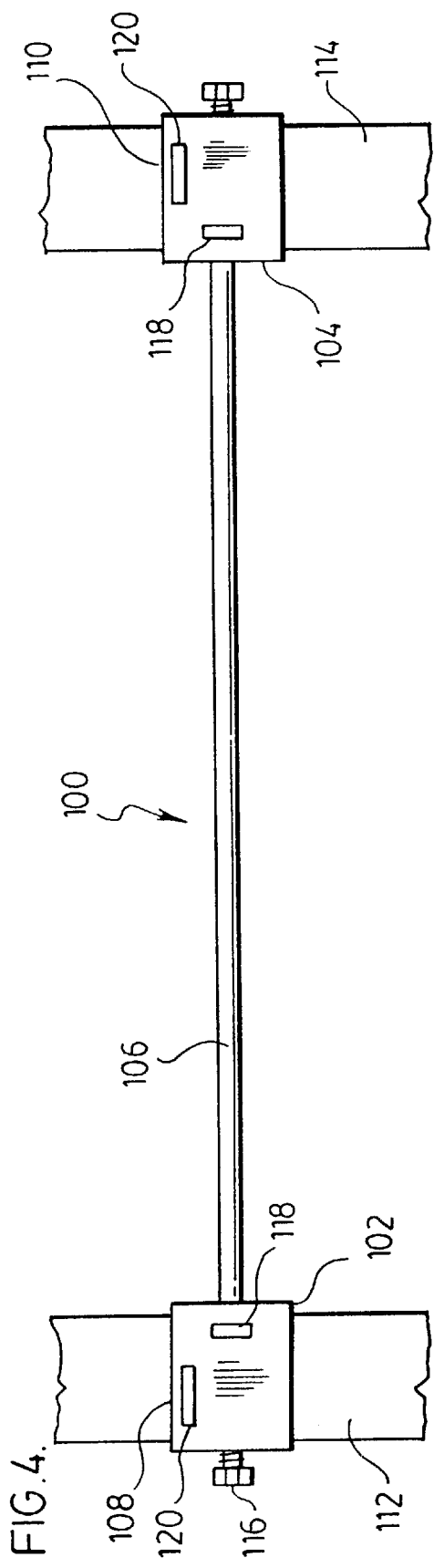
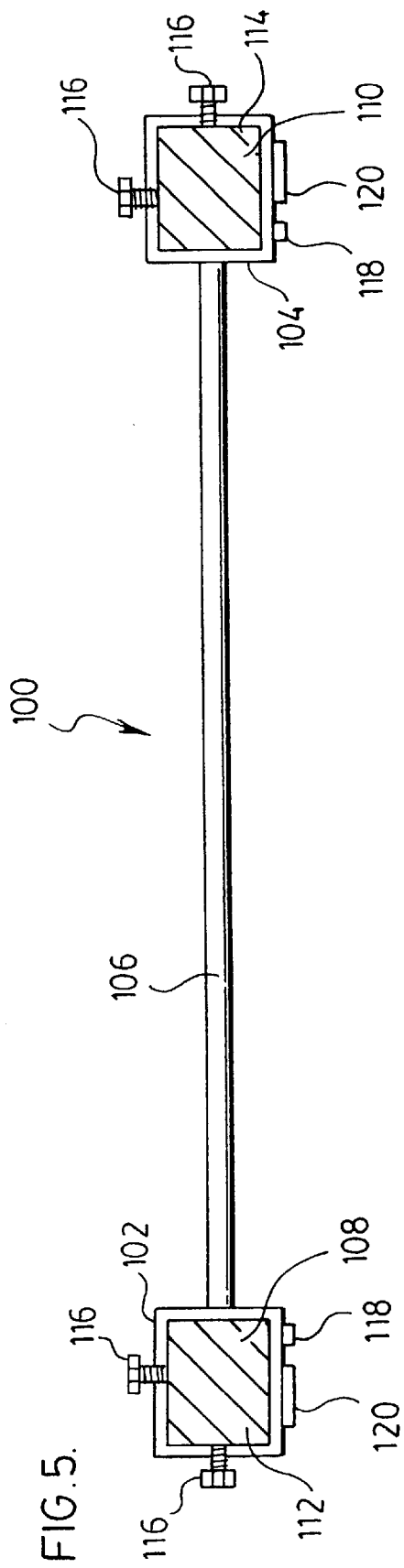

FENCE POST POSITIONING APPARATUS

FIELD OF THE INVENTION

This invention relates to apparatus to accurately position and level a plurality of fence posts.

BACKGROUND TO THE INVENTION

Apparatus for the leveling of fence posts are known in the art, for example, as follows.

U.S. Pat. No. 4,311,300, published Jan. 19, 1982 to Buerger, Eddy C. describes apparatus to brace post footings and space posts for accurately holding a post or plurality of posts in alignment. The apparatus is preferably used in the construction of fences composed of preformed materials where precise alignment and distance between posts is critical. The apparatus consists of a plurality of clamps and spacing bars. The clamps are designed to snugly abut preformed posts of various dimensions. A first clamp lies upon the ground above a dug hole and holds a preformed pole in place in the dug hole. At least a second clamp is attached further up the post. Accurate spacing and steadying is provided by a spacing bar which attaches or snugs up to the clamps. The spacing bars communicate with at least another post and clamp assembly, and precise placement of poles in linear arrangement is accomplished. After the assembly is secured, application of permanent footing material, such as poured concrete, can be accomplished without disturbing the alignment of the poles. After the permanent footing has solidified, the clamps and spacers are removed and the posts are fixed in accurate alignment both vertically and between each other.

U.S. Pat. No. 4,663,856, published May 12, 1987 to Hall, S. S. et al. describes an apparatus to level a post. A kit is provided which is primarily designed to facilitate the construction of a fence with vertical posts and horizontal rails. The kit includes a leveling/plumbing device having a central level for indicating a horizontal position, and an end level for indicating a vertical position. The device is attachable to a workpiece being positioned, by separable fasteners of the hook and loop type. The user can then use two hands to position the workpiece while observing the desired one of the levels.

U.S. Pat. No. 4,976,040, published Dec. 11, 1990 to Mish, J. E. et al. describes apparatus to level and position a fence post by indicating and proper positioning of the post, including a first and second spirit level member, with a first elastic band securing the first and second spirit level together, and a second elastic band directed exteriorly of the second spirit level member, including a loop securable to a hook mounted to the first spirit level member to encompass a post. The elastic bands each include flexible magnetic members mounted coextensively with the elastic bands, and further including apertures directed through the first and second bands to receive fasteners, such as nails, to selectively mount the organization to the post by utilization of fasteners, magnetic attraction, or frictional elastic encompassing of an associated post.

U.S. Pat. No. 5,207,004, published May 4, 1993 to Johnson Level and Tool Mfg. Co., Inc., as assignee, describes a post level is defined by a pair of right-angle walls. A horizontal bubble vial is mounted in each wall, and a vertical bubble vial is mounted at the intersection of the walls. The vials are mounted in the interior of a pair of spaced protrusions formed in each wall, which define internal structure engaging and cradling an end of the vial without positively retaining the vial within the protrusion. The protrusions open onto the inner surface of the walls, and a retainer plate is positioned over the opening of the protrusions to retain the vials within the interior of the protrusions. The retainer plate is light-reflective to enhance visibility of the vial bubble.

U.S. Pat. No. 5,255,443, published Oct. 26, 1993 to Great Neck Saw Manufacturing Inc., as assignee, describes a post level having two spaced holders fixed to two plate-like body members with a notch between the holders. A floor member is integrally attached to the body members. Each holder provides a channel that receives the end of a level vial. One of the holders has a stop to engage an end of the vial. The other holder has a detent fixed thereto that urges and resiliently engages a second end of the vial to hold the vial in position in the holder.

U.S. Pat. No. 5,594,669, published Jan. 14, 1997 to Zircon Corporation, describes an electronic-fence post level for leveling a fence post or other vertical member having two inclination sensors mounted orthogonally. The sensors measure inclination in each of two orthogonal planes. The output of the sensors is displayed by two scales which intersect at a central point. Each scale includes a number of triangular shaped segments arranged along a line. Each of the two scales depicts inclination in a plane determined by its associated sensor, when the fence post is at the vertical position the display so indicates by illuminating a central display point at the intersection. Otherwise the illuminated triangular shaped arrowhead for each scale indicates in which direction the worker is to move the fence post in each of the two corresponding dimensions so as to achieve vertically.

U.S. Pat. No. 6,029,359, published Feb. 29, 2000 to Kapro Industries Ltd., describes a post, pipe and sign level having a pair of arms pivotally attached to each other at a hinge, each arm defining at least one level face for plumbing a surface, and at least one bubble vial mounted on at least one of the arms on a surface generally opposite to the at least one level face, wherein the arms may be swung about the hinge so as to be positioned generally parallel with each other with the at least one bubble vial being between the arms.

However, there is a need for an apparatus which not only beneficially levels a fence post, but accurately positions the post relative to an adjacent post.

SUMMARY OF THE INVENTION

It is an object of the present invention to provide a fence post level apparatus that facilitates the exact positioning of adjacent posts, adjustable to suit various types of fence.

It is a further object to provide a fence post apparatus which enhances the alignment of fence posts level in both a vertical and horizontal axis.

It is still a further object to provide a fence post apparatus which enables cross post fence members to be readily installed, single-handedly and level between adjacent posts.

In one aspect, the invention provides a fence post positioning and leveling apparatus comprising
  a) an elongate spacing member having a first end and a second end and a longitudinal axis;
  b) a first posting-embracing frame member rigidly connected to said spacing member at said first end, and having a first vertical axis perpendicular to said longitudinal axis of said spacing member;
  c) a second posting-embracing frame member rigidly connected to said spacing member at said second end, and having a second vertical axis perpendicular to said longitudinal axis of said spacing member, whereby said first vertical axis is parallel to said second vertical axis;

d) wherein each of said first and second post-embracing frame members has
   i) rectangularly-shaped sides defining a post-embracing chamber adapted to receive a post therein; and
   ii) releasable locking means for retaining said post in secure abutment with said sides;

e) horizontal level visual inspection means on at least one of said first and second post-embracing frame members; and f) vertical level visual inspection means on at least one of said first and second post-embracing frame members.

The spacing member is preferably integrally formed with one or, more preferably, both of the post-embracing members.

Although the post may be received by the receiving member in close fitting engagement by merely forcing the post into the chamber, for ease of operation and subsequent secure engagement of the post, releasable locking means, such as a threaded bolt or screw are most preferred.

Thus, in one embodiment, the elongate spacing member is of a fixed, selected length, for example, of 2–10 feet, preferably 6 feet or 8 feet as typical inter-fence post distances.

Although the rigidity of the spacing member, such as a rod, bar, tube and the like is sufficient to enable horizontal alignment along the longitudinal axis to be obtained once the visual leveling means on only a single frame member is inspected and the apparatus set, for improved checking, each frame member at both of the spacing member ends should have its own leveling means.

In a preferred aspect, the invention provides fence post positioning and leveling apparatus comprising in combination a first post-embracing frame member having an operable and closeable side wall having an inner face defining in a closed mode a post-receiving chamber; rotation means to allow of said opening and closing of said side wall; releasable fastening means to hold said side wall in said closed mode; a second post-embracing frame member having an operable and closeable side wall having an inner face defining in a closed mode a post-receiving chamber; inter-frame elongate member positioning means adapted to be connected to said first and said second frame members to provide a desired fixed inter-frame member distance.

Although independent horizontal level and vertical level determination means, such as for example spirit levels, may be used with the spacing apparatus as hereinbefore defined, preferably one or, more preferably, both of the level means are permanently attached to the frame members.

Accordingly, in one preferred aspect the invention provides fence post positioning and leveling apparatus comprising in combination a first post-embracing frame member having an operable and closeable side wall having an inner face defining in a closed mode a post-receiving chamber; rotation means to allow of said opening and closing of said side wall; releasable fastening means to hold said side wall in said closed mode; a second post-embracing frame member having an operable and closeable side wall having an inner face defining in a closed mode a post-receiving chamber; first horizontal level determination means on said first frame member; first vertical level determination means on said first frame member; second horizontal level determination means on said second frame member; second vertical determination means on said second frame member; and inter-frame elongate member positioning means adapted to be connected to said first and said second frame members to provide a desired fixed inter-frame member distance.

The positioning means may comprise, in one embodiment, a single one-piece elongate member adapted to be connected at its ends to the frame members. In this case, the elongate member provides a fixed, non-variable inter-frame distance.

Preferably, the inter-frame positioning means comprises apparatus as hereinbefore defined wherein said inter-frame positioning means comprises a first rigid elongate member having a first end connected to said first frame member and a first terminal portion distal of said first end; a second rigid elongate member having a second end connected to said second frame member and a second terminal portion distal of said second end; wherein said first terminal portion and second terminal portion are connectable one to the other to provide an extended elongate lockable positioning member of a selected length connecting said first frame member to said second frame member at a selected distance therefrom; and releasable locking means for holding said first rigid member to said second rigid member at said selected distance.

Telescopic forks offer a most convenient inter-frame positioning means.

The frame members may be open-faced provided the other essential integers of the apparatus are suitably present. However, a full wall face is most preferable, to which a telescopic arm is integrally formed.

One or both of the telescopic arms most preferably have distance markings and screw, bolts or like holes for receiving screws, bolts or like fastening members.

The apparatus may be formed of any suitable material, such as preferably, a non-corrodible lightweight material, such as for example, aluminum, fibreglass or rigid plastics material.

The frame members at a suitable part are hinged to provide for opening and closing of the member around a post and are releaseably lockable, for example, by a knuckle lock mechanism.

Most preferably, the frame member has a horizontal post support means to receive an end of a horizontal cross-post. A preferred support means is a protruding lip extending horizontally from the top edge of the frame member upon which the horizontal post end sits. In a further feature, the lip may be integrally formed with a perpendicular lip extending vertically upwardly from the horizontal lip. This vertical extension assists location and retention of the end of a cross-piece on the horizontal lip.

In a preferred aspect, the invention provides fence post positioning and leveling apparatus comprising in combination a first hollow, rectangular-shaped frame member having
  (i) four vertically aligned parallel faces which in a frame member closed mode define a rectangular-shaped post-receiving chamber therebetween;
  (ii) releasable fastening means to hold said frame member in said closed position;
  (iii) rotation means to enable at least one pair of adjacent said faces to rotate apart one from the other around the vertical axis;

a second hollow, rectangular-shaped frame member having four vertically aligned parallel faces which in a frame member closed mode define a rectangular-shaped post-receiving chamber therebetween; releasable fastening means to hold said frame member in said closed position; rotation means to enable at least one pair of adjacent said faces to rotate apart one from the other around the vertical axis; horizontal level determination means on said first frame member and said second frame member; vertical level determination means on said first frame member and said second frame member; and a pair of lockable, rigid elongate telescopic fork members comprising a first elongate rigid telescopic fork member having a first end and a terminal portion distal of said first end; a second elongate rigid telescopic fork member adapted to be received by said first fork member in telescopic engagement; locking means for retaining said first and second fork members in said telescopic engagement at a desired location therein; wherein said first end of said first elongate member is integrally formed with said first frame member; and said first end of said second elongate member is integrally formed with said second frame member.

BRIEF DESCRIPTION OF THE DRAWINGS

In order that the invention may be better understood, a preferred embodiment will now be described by way of example only, with reference to the accompanying drawings wherein:

FIG. 4 is a diagrammatic side view of an alternative fence post positioning apparatus according to the invention;

FIG. 5 is a plan view of the apparatus of FIG. 4; and wherein the same numerals denote like parts.

DETAILED DESCRIPTION OF A PREFERRED EMBODIMENT

Figure 1:
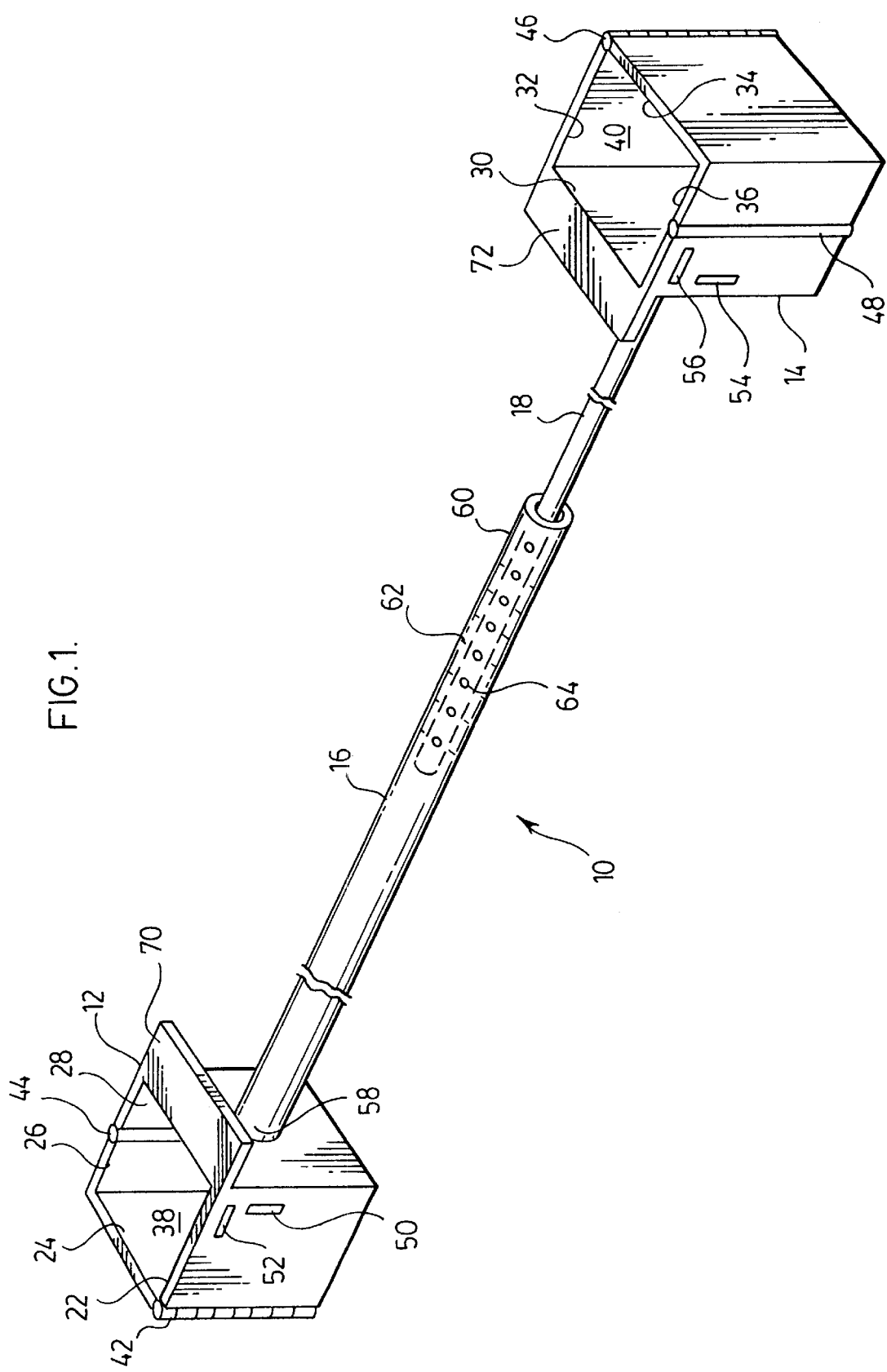
FIG. 1 is a diagrammatic perspective view of a fence post positioning apparatus according to the invention.

With reference to FIG. 1 this shows generally as 10 an assembled apparatus comprising a pair of aluminum post frame members 12, 14 joined together through a pair of aluminum telescopic forks 16, 18 in telescopic arrangement.

Figure 2:
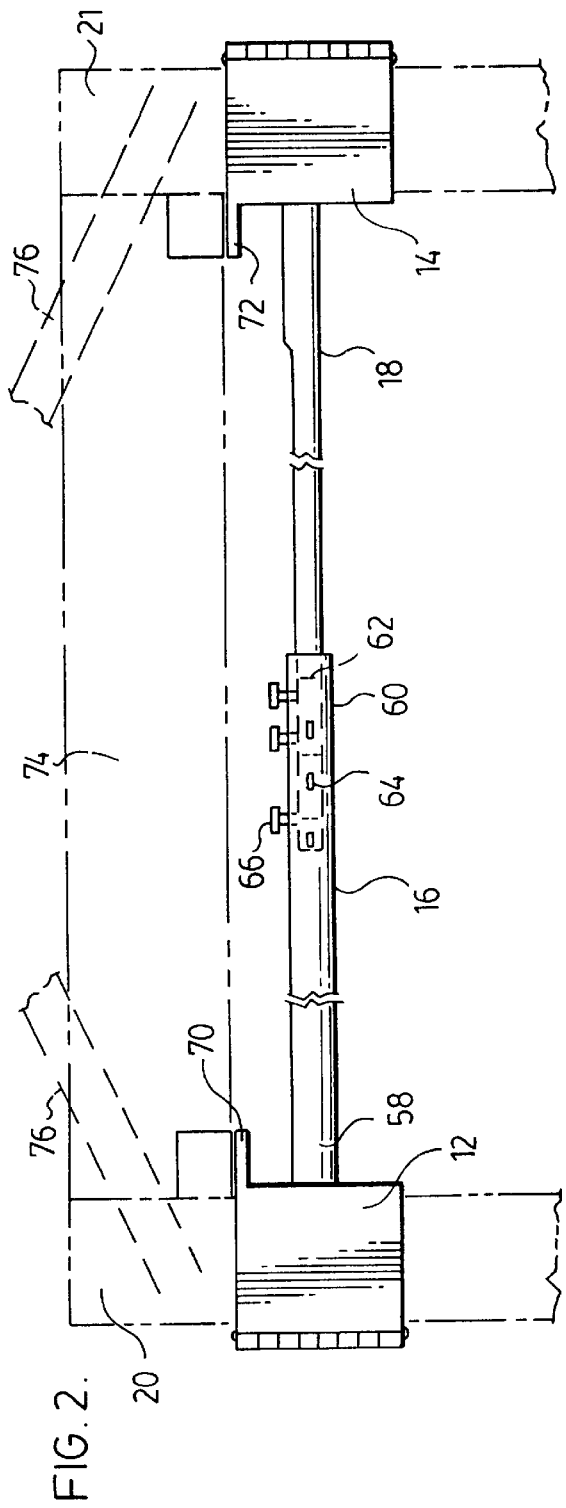
FIG. 2 is a diagrammatic side view of an apparatus according to the invention embracing a pair of vertical fence posts (in part)
Figure 3:
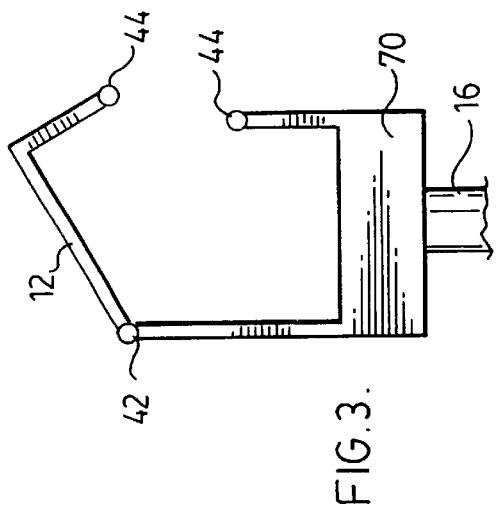
FIG. 3 is a diagrammatic top view of a frame member of use in the practice of the invention in an open, non-post embracing mode.

Frame members 12 and 14 are formed in a closed position to embrace rectangular wood posts 20, 21, respectively, typically of nominal 10 cm×10 cm square×2–3 m length (FIG. 2). Each of frame members 12, 14 has side walls having four vertically aligned parallel inner faces 22, 24, 26, 28 and 30, 32, 34, 36, respectively, which define post-embracing chambers 38, 40, respectively, when in their closed positions, as shown in FIGS. 1 and 2.

Frame member 12 at a corner has a hinge 42 and a knuckle lock 44 at a side wall of face 26 opposing hinge 42. Thus, frame member 12 is openable by release of lock 44 and rotation of side walls around hinge 42. This opening enables vertical wood post 20 to be either inserted or removed from chamber 38 when opened. Similarly, frame member 14 has a corner hinge 46 and a knuckle lock 48.

Frame member 12 has a vertical spirit level 50 and a horizontal spirit level 52 attached to face 22. Frame member 14 has similar vertical spirit level 54 and horizontal spirit level 56 on face 36.

Elongate tubular telescopic female fork 16 has an internal diameter of 2.5 cm and at its end 58 is integrally formed with frame member 12 perpendicular to side wall 28. Fork 16 may be of any desired practical length, for example, 1.5 m in the embodiment shown and has a terminal portion 60, distal from end 58 provided with graduated distance marks 62 and a plurality of screw holes 64 and associated screws 66.

Elongate telescopic fork 18 is of the same length as fork 16 but of an outside diameter of just less than 2.5 cm to enable male fork 18 to be received by female fork 16 in suitable telescope engagement, and rigidly locked thereto by screws 66 through screw holes 64 at a desired location.

Fork 18 is similarly integrally formed at its end 68 with frame member 14 at a side wall 30.

Each of frame members 12 and 14 has an integrally formed lip 70, 72, respectively, protruding from opposing faces 28, 30, respectively, upon which rests cross part 74 abutting respective posts 20, 21 to which post 74 is secured by nails 76, in the embodiment shown. This enables a single person, alone, to accurately position the cross-piece horizontally, accurately and securely for attachment to vertical posts 12, 14.

The apparatus 10 is used in operation in the following general steps.

A first vertical post is set loosely into a pre-dug hole. The hinge on a frame member is opened, embraced around the post and clamped with the knuckle lock. The frame member is positioned on the vertical post at a position that correctly locates the lip adjacent the post in order for the cross post to be subsequently correctly horizontally positioned, with its telescopic arm pointing in the desired direction. The post is adjusted to be exactly vertical and horizontal by means of the two spirit levels, and cemented or otherwise rigidly retained into place.

Once the cement is set, the complimentary telescopic fork of a second frame member is slide into or around, as the case may be to the desired, selected distance using the graduated markings on the arm, say, of the second frame member and the two forks locked together by screws, bolts or the like.

The second frame is then opened and a second vertical post is loosely placed in a pre-dug hole and clamped by the second frame. The second post will be level and square at the desired distance from the first post if the latter is level and square and the lock down bolts; screws and the like of the telescopic forks are tight.

Once the cement around the second post is set, the position of the cross frame posts relative to the height of the vertical posts can be selected and attained by the opening of the knuckle locks on both frame members and the latter slide up or down as the case may be and suitably locked. This leaves both hands of a single person free for inserting and securing the cross-post. The frame members are subsequently removed and transferred to a new vertical post and suitably repositioned on the second post with the arm pointing in a new desired direction.

With reference to FIGS. 4 and 5, these show generally as 100 apparatus according to the invention having a pair of rectangular-shaped frame members 102, 104 integrally formed at the ends of elongate spacing member 106. Each of frame members 102, 104 has four sides formed of 3 mm thick mild steel plate which define post-embracing chambers 108, 110.

Spacing member 106 is formed as a solid mild steel rod of a length which, with the thickest of each of a side of frame member 102 and 104, provides a rigid, desired, pre-set inter-post distance, for example, 8 feet in the embodiment shown.

Once posts 112 and/or 114 are located within respective chambers 108, 110, respectively, the post is secured, therein, by threaded bolts 116. Each frame member 102, 104, in the embodiment shown, has a vertical and horizontal visual inspection spirit level, 118, 120, respectively, by which vertical and horizontal positioning of the apparatus can be set, as hereinbefore described.

Although this disclosure has described and illustrated certain preferred embodiments of the invention, it is to be understood that the invention is not restricted to those particular embodiments. Rather, the invention includes all embodiments which are functional or mechanical equivalence of the specific embodiments and features that have been described and illustrated.

What is claimed is:

1. A fence post positioning and leveling apparatus comprising
   a) an elongate spacing member having a first end and a second end and a longitudinal axis;
   b) a first posting-embracing frame member rigidly connected to said spacing member at said first end, and having a first vertical axis perpendicular to said longitudinal axis of said spacing member;
   c) a second posting-embracing frame member rigidly connected to said spacing member at said second end, and having a second vertical axis perpendicular to said longitudinal axis of said spacing member, whereby said first vertical axis is parallel to said second vertical axis;
   d) wherein each of said first and second post-embracing frame members has
      i) four rectangularly-shaped sides defining a post-embracing chamber adapted to surround and receive a portion of a post therein; and
      ii) releasable locking means extending through at least one of said sides for retaining said post in secure abutment with at least certain of said sides;
   e) horizontal level visual inspection means on at least one of said first and second post-embracing frame members; and
   f) vertical level visual inspection means on at least one of said first and second post-embracing frame members.

2. Apparatus as defined in claim 1 wherein said first and said second post-embracing frame members are integrally formed with said spacing member.

3. Apparatus as defined in claim 1 wherein said releasable locking means comprises a threaded bolt or screw.

4. Apparatus as defined in claim 1 wherein said spacing member has a length selected from 2–8 feet.

5. A fence post positioning and leveling apparatus comprising in combination
   a first post-embracing frame member having four side walls with at least one of the side walls being openable and closeable, each side wall having an inner face defining in a closed mode a post-receiving chamber constructed and arranged to surround a portion of a post;
   rotation means to allow of said opening and closing of said one side wall;
   releasable fastening means to hold said one side wall in said closed mode;
   a second post-embracing frame member having four side walls with at least one of the side walls being openable and closeable, each side wall having an inner face defining in a closed mode a post-receiving chamber constructed and arranged to surround a portion of a post; and
   inter-frame elongate member positioning means adapted to be connected to said first and said second frame members to provide a desired fixed inter-frame member distance.

6. Apparatus as defined in claim 5 further comprising
   first horizontal level determination means on said first frame member;
   first vertical level determination means on said first frame member;
   second horizontal level determination means on said second frame member; and
   second vertical determination means on said second frame member.

7. Apparatus as defined in claim 5 wherein said inter-frame positioning means comprises
   a first rigid elongate member having a first end connected to said first frame member and a first terminal portion distal of said first end;
   a second rigid elongate member having a second end connected to said second frame member and a second terminal portion distal of said second end;
   wherein said first terminal portion and second terminal portion are connectable one to the other to provide an extended elongate lockable positioning member of a selected length connecting said first frame member to said second frame member at a selected distance therefrom; and releasable locking means for holding said first rigid member to said second rigid member at said selected distance.

8. Apparatus as defined in claim 7 wherein said inter-frame positioning means comprises telescopic fork means.

9. Apparatus as defined in claim 7 wherein said first end is integrally formed with said first frame member, and said second end is integrally formed with said second frame member.

10. Apparatus as defined in claim 7 wherein said first elongate member has graduated distance markings on said first terminal portion.

11. Apparatus as defined in claim 5 wherein said one side wall is open-faced.

12. Apparatus as defined in claim 5 wherein said rotation means comprises hinge means.

13. Apparatus as defined in claim 5 wherein said releasable fastening means comprises a knuckle lock clamping means selected from a knuckle lock means, nut and bolt means and screw means.

14. Apparatus as defined in claim 5 wherein said frame members and said positioning means are formed of aluminum, fibreglass or a rigid plastics materials.

15. Apparatus as defined in claim 5 wherein each of said first frame member and said second frame member has a cross-post support means extending from each of said first and second frame to provide support to a horizontal cross post when said post is extended between said first and second frame member in a desired position to be held to said vertical posts.

16. Apparatus as defined in claim 15 wherein each of said cross-post support means comprises an integrally formed lip located on a face of said first frame and said second frame at an upper part thereof to enable said cross post to be fastened to vertical posts embraced by said first and second frame members.

17. Fence post positioning and leveling apparatus comprising in combination
   a first hollow, rectangular-shaped frame member having
      (i) four vertically aligned parallel faces which in a frame member closed mode define a rectangular-shaped post-receiving chamber therebetween;
      (ii) releasable fastening means to hold said frame member in said closed position;

(iii) rotation means to enable at least one pair of adjacent said faces to rotate apart one from the other around the vertical axis;

a second hollow, rectangular-shaped frame member having (iv) four vertically aligned parallel faces which in a frame member closed mode define a rectangular-shaped post-receiving chamber therebetween;

(v) releasable fastening means to hold said second frame member in said closed position;

(vi) rotation means to enable at least one pair of adjacent said faces to rotate apart one from the other around the vertical axis;

horizontal level determination means on said first frame member and said second frame member;

vertical level determination means on said first frame member and said second frame member; and a pair of lockable, rigid elongate telescopic fork members comprising a first elongate rigid telescopic fork member having a first end and a terminal portion distal of said first end;

a second elongate rigid telescopic fork member adapted to be received by said first fork member in telescopic engagement;

locking means for retaining said first and second fork members in said telescopic engagement at a desired location therein;

wherein said first end of said first elongate member is integrally formed with said first frame member; and said first end of said second elongate member is integrally formed with said second frame member.

* * * * *